Jan. 9, 1951  N. D. ABBEY  2,537,503
ADJUSTING MECHANISM FOR WELDING ELECTRODE ROLLS
Filed April 29, 1949  2 Sheets-Sheet 1
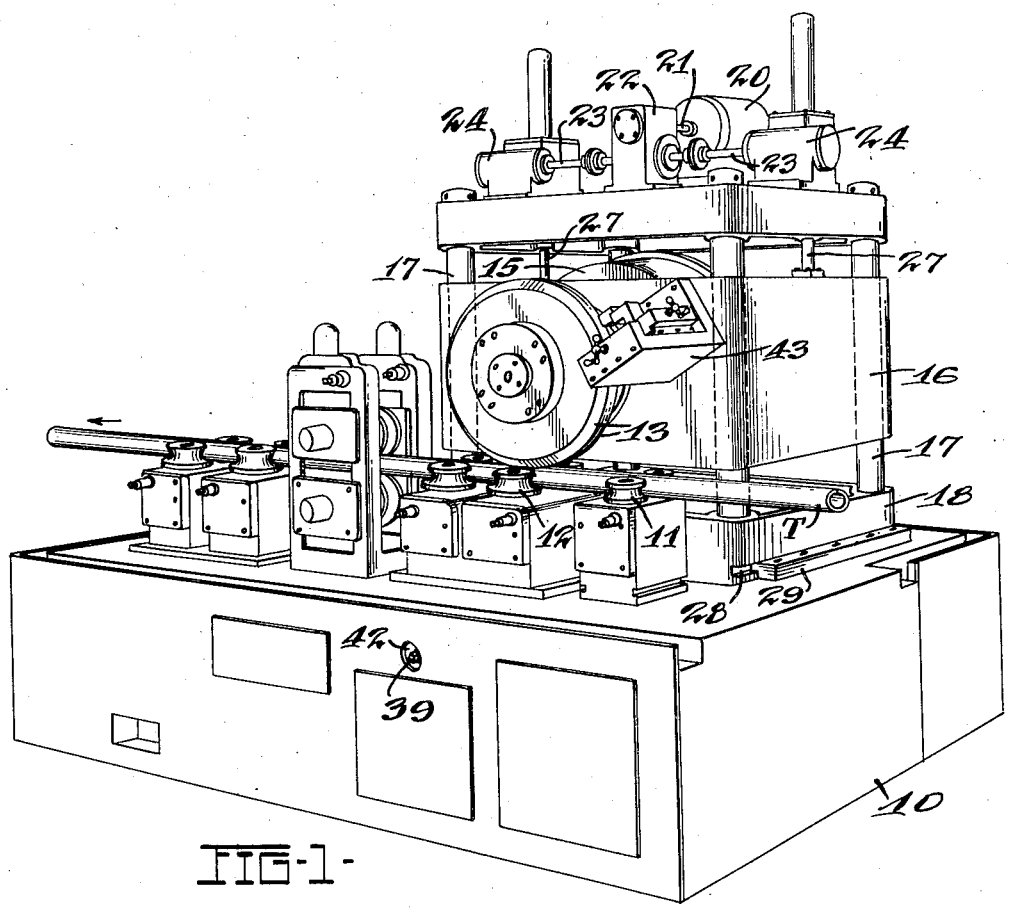
FIG-1-
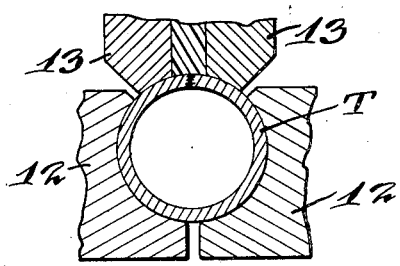
FIG-4-
INVENTOR:
NELSON D. ABBEY.
BY
Malcolm W. Fraser
ATTY.

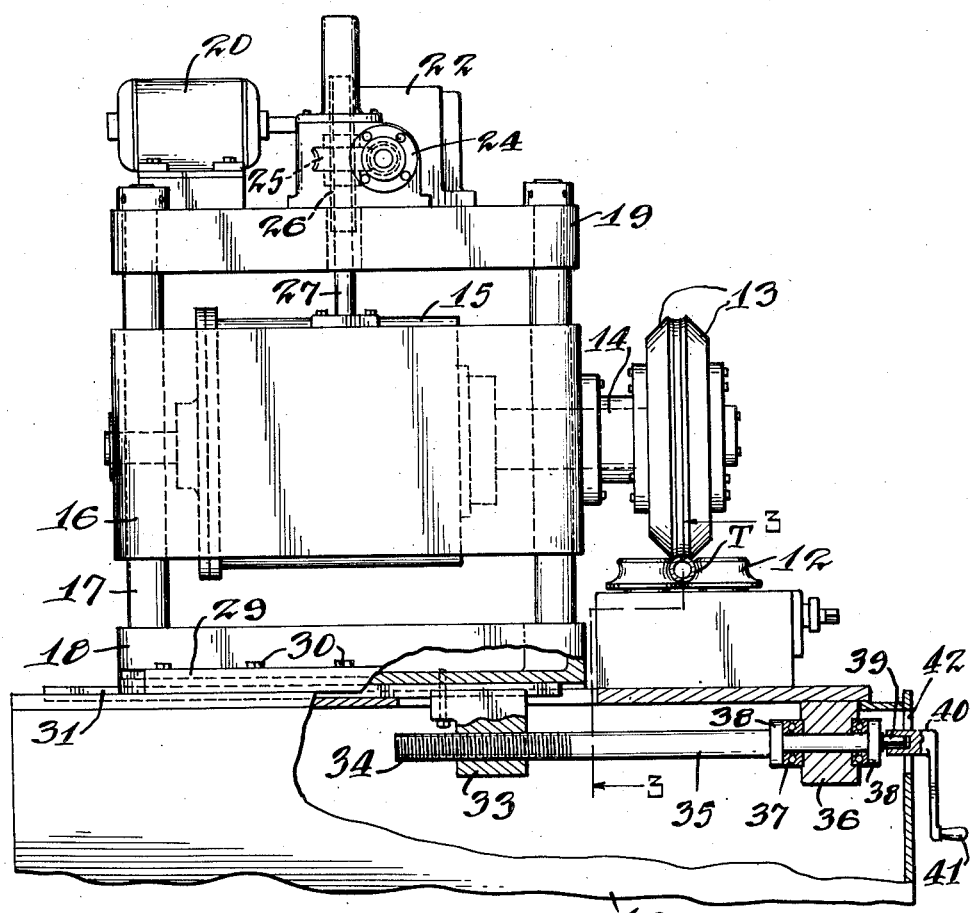
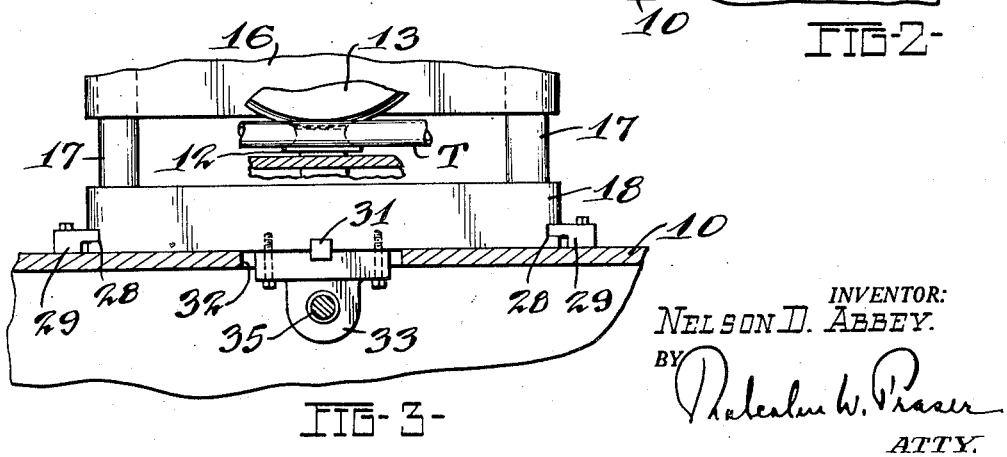

Patented Jan. 9, 1951

2,537,503

UNITED STATES PATENT OFFICE 2,537,503

ADJUSTING MECHANISM FOR WELDING ELECTRODE ROLLS

Nelson D. Abbey, Toledo, Ohio

Application April 29, 1949, Serial No. 90,336

1 Claim. (Cl. 219—6)

This invention relates to tube mills but particularly to machines employing rotating welding electrode rolls for welding together the edges of an axial seam-cleft in a cylindrical pipe length formed from a flat ribbon.

In tube mills for producing welded seam tubing, the tube is progressively formed from a flat ribbon by a series of rolls arranged in pairs at spaced intervals. Not infrequently, a distance of fifty feet intervenes between the initial flat form of the strip and the tube form at the welding station. It is important that these various rolls, as well as the electrode rolls, be properly aligned to militate against bending the tube and thereby imposing undue frictional resistance to the advancing movement of the tube and obviating the liability of displacing the edges of the tube relative to the welding electrode rolls.

From time to time, the position of the welding electrode rolls changes axially due to the expansion under influence of heat, of the transformer shaft. Even though this change may be slight, it is sufficient to interfere with efficient welding and, therefore, must be compensated for one way or another. Several expedients have been resorted to in order to cope with this problem but they have achieved only partial success.

For example, effort has been made to adjust the long series of rolls but manifestly, this is difficult, time-consuming, and often results in bending the tube. The latter is particularly evident if the welder support rolls alone are adjusted independently of the remaining rolls.

Another expedient has been the dressing of the grooves in the welding electrode rolls, but this entails not only shutting down of the entire mill, but also wastes expensive copper of which the electrodes are formed.

A further expedient has involved the axial adjustment of the transformer shaft to compensate for such expansion. This has required the adjustment of the shaft bearing boxes but this has proved to be impractical because of the relative inaccessibility of the adjusting mechanism and the necessity of carefully and uniformly adjusting the several mechanisms. This also required shutting down of the transformer especially when the adjusting devices are at the front and near the electrodes because of the danger hazard. With the adjusting devices at the rear of the machine, the services of two men are required, one to observe the position of the electrode rolls and the other to effect the adjustment.

From the above, it will be apparent that it is a desideratum to produce a simple and efficient mechanism for axially adjusting the welding electrode rolls during the operation of the transformer from the front of the tube mill so that one operator can make the adjustment readily, conveniently and accurately and from time to time as conditions require. It is an object of this invention to produce such mechanism.

For purposes of illustration but not of limitation, an embodiment of the invention is shown on the accompanying drawings, in which Figure 1 is a front perspective view of a portion of a tube mill and showing particularly the adjustable unitary mounting for the transformer welding electrode rolls and associated parts;

Figure 2 is a side elevation of the adjustable unitary mounting for the transformer and welding electrode rolls, parts being broken away to show the adjusting mechanism for axially shifting the welding electrode rolls;

Figure 3 is a sectional view substantially on the line 3—3 of Figure 2; and

Figure 4 is a fragmentary sectional view showing the manner in which the welding rolls and pressure rolls engage the tube during the welding operation.

The illustrated embodiment of the invention comprises a bed or frame 10 which provides a platform on which are mounted, on vertical axes, rolls arranged in pairs and spaced from each other. Only a portion of these rolls is shown because the tube is formed from a flat strip which is progressively formed into a cylinder or tube T as the strip advances. These rolls which are illustrated are pressure or welder support rolls. The tube T is formed so that the free edges are uppermost and as shown in Figure 4, are held by pressure rolls 12 engaging on opposite sides of the tube. The metal in the region of the spaced edges is fused in response to a pair of electrode rolls 13 which are contoured to fit the external walls of the tube and rotate as a result of frictional engagement with the tube as the latter advances, it being understood that rolls (not shown) are power driven to impart advancing movement to the tube. The electrode rolls 13 are suitably mounted in a rigid manner upon the outer end of a transformer shaft 14, the transformer being indicated at 15 and being disposed within a housing 16. It is to be understood that electrical current is delivered to the transformer 15 in any suitable manner and that current from the transformer is delivered to the electrode rolls 13 in any suitable or well-known fashion and since the same forms no part of the present invention, detail illustration and description thereof is not considered necessary.

The housing 16 is of substantially rectilinear form and in each corner thereof is an upright column 17 and the lower ends of the columns are rigid with a base 18. The upper ends of the columns 17 are rigidly connected to a platform 19 on which is mounted an electric motor 20 whose shaft 21 connects through a gear reduction contained within a box 22 to horizontal shafting 23. At opposite ends of the shafting 23 are worms contained within casings 24 and each worm meshes with a worm wheel 25 operating a screw-threaded shaft 26 which is in threaded engagement with the upper end of a rod 27, the lower end of which is secured to the housing 16. Thus by operating the motor 20 through the connections described, the housing 16, the transformer 15 and associated parts may be raised and lowered along the columns 17, thereby to control the vertical positioning of the electrode rolls 13.

From the above, it will be apparent that the transformer welding rolls and associated structure are mounted as a unit upon the base 18. As will hereinafter appear, the base 18 is mounted for translatory shifting movement transversely of the bed 10 thereby to enable axial adjustment of the welding rolls 13 thereby to enable expansion of the transformer shaft displacing the electrodes relative to the seam to be welded, to be readily and accurately compensated for.

Formed on opposite sides of the base 18 are elongate grooves 28 into which project gibs 29 which are secured by bolts 30 to the bed 10. In order that the base 18 move rectilinearly, a key 31 is disposed centrally between the base 18 and the bed 10. Fixed to the under side of the base 18 and extending into an elongate slot 32 in the top of the bed 10 is a bracket 33 which is screw-threaded to engage the threaded end portion 34 of a shaft 35. The outer end portion of the shaft 35 extends through a beam 36 rigid with the bed 10, anti-friction thrust bearings 37 being disposed on opposite sides of the beams and collars 38 integral with the shaft 35. On the outer end of the shaft 35 is a squared end portion 39 which may be engaged by a socketed hub 40 of a hand crank 41. An opening 42 in the front of the bed 10 affords access to the squared end.

From the above description, it will be manifest that when it is necessary to effect axial adjustment of the welding electrode rolls 13, by applying the hand crank 41 to the squared end 39 of the shaft 35 and rotating the screw 34 in one direction or the other, the entire unit may be shifted transversely of the bed 10. This adjustment may be effected during the operation of the transformer as well as the tube mill. Since only fine adjustments are ordinarily necessary, the pitch of the threads 34 on the shaft 35 is accordingly fine. It will be apparent that this adjustment can be effected from the front of the machine so that the operator can watch the position of the welded seam and any deviation from the proper location of the seam can quickly and accurately be rectified. It will be understood that the vertical adjustment effected through the operation of the electric motor 20 is only made for different diameters of the tube T and ordinarily one setting is sufficient for one diameter of the tube. The compensation required is principally the axial adjustment of the electrode rolls 13 caused, as above pointed out, by the expansion of the metal of the transformer, transformer shaft and associated parts.

Mounted on the front face of the housing 16 is an electrode dressing device 43 by means of which each of the electrode rolls 13 may from time to time be dressed as occasion demands. This structure is well-known to those skilled in this art, and since it forms no part of the present invention, further description is not considered necessary.

It is to be understood that numerous changes in details of construction, arrangement and operation may be effected without departing from the spirit of the invention especially as defined in the appended claim.

What I claim is:

A tube welding machine comprising a support having a front and a rear, a plurality of rolls arranged on said support at spaced intervals and forming an elongate series extending lengthwise of and adjacent to said front, a transformer supporting frame arranged on said support rearwardly of said rolls, a transformer within said frame, a rotatable transformer shaft rotatably carried by said supporting frame and having a free end extending forwardly therefrom and lying transversely over said roll series, a pair of welding electrode rolls deriving current from said transformer, said rolls being mounted on said forwardly extending transformer shaft adjacent the free end thereof and being respectively dimensional and spaced to engage a tube engaged in said roll series, an elongate guideway extending rearwardly on said support from said roll series movably mounting said transformer supporting frame on said support, and adjusting means on said support for adjusting said transformer supporting frame along said guideway, said adjusting means being disposed in front of the welding electrode rolls whereby to enable the operator to effect axial adjustment of the rolls while viewing the position of the electrode rolls with respect to the tube.

NELSON D. ABBEY.

REFERENCES CITED

The following references are of record in the file of this patent:

UNITED STATES PATENTS

| Number | Name | Date |
|---|---|---|
| 1,811,886 | Hunter | June 30, 1931 |
| 2,181,652 | Caputo | Nov. 28, 1939 |
| 2,196,106 | Darner | Apr. 2, 1940 |

FOREIGN PATENTS

| Number | Country | Date |
|---|---|---|
| 505,585 | Great Britain | May 12, 1939 |